United States Patent [19]

Bandyopadhyay et al.

[11] Patent Number: 4,888,037

[45] Date of Patent: Dec. 19, 1989

[54] GLASS TO METAL SEALING PROCESS

[75] Inventors: Nikhiles Bandyopadhyay, Somerset; Satish S. Tamhankar, Scotch Plains; Mark J. Kirschner, Morristown, all of N.J.

[73] Assignee: The BOC Group, Inc., Murray Hill, N.J.

[21] Appl. No.: 229,588

[22] Filed: Aug. 8, 1988

Related U.S. Application Data

[63] Continuation-in-part of Ser. No. 105,065, Oct. 5, 1987, abandoned.

[51] Int. Cl.$^4$ .............................................. C03C 27/02
[52] U.S. Cl. ..................................... 65/32.2; 65/59.2; 65/154; 65/157
[58] Field of Search ................... 65/33, 36, 40, 42, 43, 65/155, 32.2, 59.23, 59.1, 157, 154

[56] References Cited

U.S. PATENT DOCUMENTS

| | | | |
|---|---|---|---|
| 3,631,589 | 1/1971 | Garceau | 65/32.2 |
| 3,858,378 | 1/1975 | Allen et al. | 65/59.23 |
| 4,025,327 | 5/1977 | Harris | 65/59.23 |
| 4,445,920 | 5/1984 | Smith | 65/59.21 |

FOREIGN PATENT DOCUMENTS

| | | | |
|---|---|---|---|
| 672863 | 10/1963 | Canada | 65/59.23 |
| 2135297 | 2/1984 | United Kingdom | |

*Primary Examiner*—Kenneth M. Schor
*Assistant Examiner*—Craig Wurzel
*Attorney, Agent, or Firm*—Carol A. Nemetz; R. Hain Swope; Larry R. Cassett

[57] ABSTRACT

A single-step process is disclosed for hermetically sealing a glass to a metal having similar coefficients of thermal expansion without carrying out the conventional pretreatment steps of decarburization and oxidization by heating to at least the melting point of the glass in an atmosphere containing from about 0.5 to 2.5 volume percent of water vapor, 0 to about 5 volume percent of hydrogen gas and the balance an inert gas, such as nitrogen.

12 Claims, No Drawings

GLASS TO METAL SEALING PROCESS

RELATED APPLICATIONS

This application is a continuation-in-part of U.S. patent application Ser. No. 07/105,065, filed Oct. 5, 1987, now abandoned.

FIELD OF THE INVENTION

The present invention is directed to a process for fusing a glass to a metal and, specifically, to a single step sealing process that produces strong hermetic glass seals with little or no entrained gas bubble content.

BACKGROUND OF THE INVENTION

It is known in the art to fuse glass to metal to form hermetically sealed electronic components. The reliability of such components is directly dependent on the integrity of the seal. There are two types of such seals employed in the industry which are commonly referred to as "matched seals" and "compression seals" with the former referring to seals formed from metals and glass having similar coefficients of thermal expansion. It has been estimated that as much as 80 percent of such seals utilized in the industry are the matched type.

Both types of seals are commonly formed by a three-step process including (1) degassing or decarburizing of the metal surface, (2) oxidation and (3) sealing, as disclosed in United Kingdom Patent No. 2,135,297A. Such conventional processes require that the metal be initially treated to prepare the surface by decarburizing and then oxidizing to form a thin oxide layer thereon. The seal is then produced on the treated surface by fusing the thin metal oxide layer with molten glass.

By way of example, the above-mentioned United Kingdom patent teaches that the first of the treatment steps, decarburization, is carried out in an atmosphere of 100 percent hydrogen with less than about 5.0 percent by volume of moisture, preferably at a $H_2/H_2O$ volume ratio in excess of about 50. The second treatment step, i.e., oxidation, is carried out in an oxidizing atmosphere composed of a gaseous carrier containing an oxidizing agent such as water, carbon dioxide, nitrous oxide and the like and free hydrogen to reduce the oxygen content to thereby favor the formation of $Fe_3O_4$ (page 2, line 52 to page 3, line 3).

The sealing step of the conventional process, as shown in the British patent, is carried out using a lean exo-gas or a $N_2$-based atmosphere. The temperature of each of the reaction steps can vary over a wide range with the preferred temperature range for each of the three steps being different. The British patent represents the state of the art prior to the present invention, i.e. the two treatment steps are regarded as critical in the formation of a good glass-to-metal seal.

In addition to the fact that each of the treatment and sealing steps of a conventional sealing process is preferably performed at different temperatures, each is carrier out in the presence of a different gaseous enviornment, which adds greatly to the time and cost of obtaining the desired product.

Applicants have discovered a unique process for producing matched seals in which highly effective glass-to-metal seals are obtained with untreated metal in a single step employing only a single set of process conditions.

In accordance with the present invention, the atmosphere in which sealing takes place is controlled within defined limits to prevent condensation in the furnace and to provide a sufficient thin layer of oxide on the metal for proper sealing of the glass to metal. The present process is also economical because it significantly reduces the amount of hydrogen needed to effect sealing. In addition, reduction of the glass-to-metal sealing process to a single step saves considerable time since downtime of the furnace to change gaseous environments is eliminated and parts handling is reduced by about two-thirds.

It is therefore an object of the invention to provide a single-step process for forming matched glass-to-metal seals with metal that has not been subjected to the conventional pretreatment steps of decarburization and oxidation.

It is a further object of the invention to provide a process for forming glass-to-metal seals which is less costly and time-consuming than conventional methods since only one heating step in a single atmosphere is required.

It is another object of the invention to obtain glass-to-metal seals which are strong, hermetic and have little, if any, entrained gas bubbles.

SUMMARY OF THE INVENTION

The present invention is directed to a single-step process for hermetically sealing glass to untreated metal in which the glass and metal have similar coefficients of thermal expansion. The process comprises heating the glass and metal in a single atmosphere containing from about 0.5 to 2.5 volume percent of water vapor and from about 0 to 5 volume percent of hydrogen gas with the balance of the atmosphere being an inert gas, such as nitrogen or argon. The glass and metal are heated to a temperature of at least the melting point of the glass thereby fusing the melted glass to the oxide of the metal, which forms in-situ.

DETAILED DESCRIPTION OF THE INVENTION

The preferred amount of water vapor utilized in the process of this invention is from about 1.0 to 1.5 percent by volume, and the preferred amount of hydrogen gas is from about 1.0 to 2.0 percent by volume. Accordingly, the preferred amount of the inert gas (e.g. nitrogen) is from about 96.5 to 98.0 percent by volume. A particularly preferred atmosphere in accordance with this invention comprises, by volume, one percent each of water vapor and hydrogen and 98 percent of the inert gas. The term "inert gas", as utilized herein, means a gas which does not react with either the glass or the metal under the reaction conditions.

The upper limit placed on the volume percentage of hydrogen, while not particularly critical, is desirable for several reasons. Hydrogen gas is expensive and its use requires special safety precautions. Each of these factors adds to the cost of conducting the process, especially on a commercial scale. In addition, hydrogen has a tendency to retard formation of the oxide layer on the metal which is necessary for proper sealing. Accordingly, excess amounts of hydrogen, well beyond the limits mentioned above, can adversely affect the integrity of the seal.

The upper limit placed on the amount of water vapor in the present process is necessary to prevent thick oxide formation on the metal parts and to prevent condensation in the sealing furnace which can result in furnace shutdown and inadequate seals.

The sealing process of the invention is preferably conducted at a temperature of from about 1800° to 1900° F., most preferably about 1850° F., for approximately 10 to 20 minutes, most preferably about 15 minutes.

The selection of metals which may be sealed in accordance with the present invention is, in theory, unlimited with the provision that, as is conventional for a matched seal process, the metal chosen has a coefficient of thermal expansion sufficiently similar to that of the glass such that the excess pressure or compression necessary for a conventional compression seal is not required. However, those skilled in the art will appreciate that the metal must be suitable with regard to other properties such, as the ability to form an adherent oxide, the ability to withstand the conditions of the seal without becoming excessively brittle, and the like. More specifically, the difference between the coefficient of thermal expansion for the metal and glass should be no more than about $20 \times 10^{-7}$ cm/cm/°C., preferably no more more than $10 \times 10^{-7}$ cm/cm/°C. The metals which are advantageously employed in the present process include, for example, tungsten, molybdenum, titanium, tantalum and the like, and alloys such as chrome-iron alloys, nickel-chrome-iron alloys, nickel-cobalt-iron alloys and the like, with the latter being preferred. A particularly preferred nickel-cobalt-iron alloy is "Kovar" having the designation ASTM F-15.

The glasses utilized in the subject invention include, but are not limited to, borosilicates, lead silicates and borophosphosilicates. Preferred glasses are the borosilicates available as Corning Glasses 7052, 7040, 7056 and 8830 which have thermal coefficients in the range of from about $46-52 \times 10^{-7}$ cm/cm/°C.

The process of the present invention is particularly advantageous in that the seal is effected with untreated metal. By "untreated" is meant metal which has not undergone the conventional preparatory treatment steps of decarburization and oxidization which have heretofore been regarded as necessary. The efforts to date to improve glass-to-metal sealing have concentrated on enhancing one of these three steps as evidenced by the aforementioned British patent. Heretofore, it was not considered feasible to seal glass to a metal in an "as-received" condition without undertaking the traditional preparatory treatment steps. The present invention is predicated on the finding that untreated metal can be effectively sealed to glass in a single step utilizing a single atmosphere. The advantages of this in terms of money and time will be readily appreciated by one of ordinary skill in the art.

The process of the present invention may be conducted in any reaction vessel in which the desired process conditions can be maintained, such as a belt furnace. The gaseous compounds (hydrogen gas, water vapor and inert gas) comprising the reaction atmosphere may be fed to the reaction vessel through individual feed lines or, preferably as a combined feed. By way of example, a mixture of inert gas and 1 volume percent of hydrogen gas is bubbled through water at ambient temperatures to control the humidity in the gas mixture to about 1 volume percent.

EXAMPLE 1

As received commercial metal plates and pins of Kovar ASTM F-15 were assembled, without pretreatment, with borosilicate glass beads (Corning 7052) into a conventional graphite fixture. The metal and the glass had coefficients of thermal expansion of $57.1-62.1 \times 10^{-7}$ cm/cm/° C. and $46 \times 10^{-7}$ cm/cm/° C., respectively. A conventional belt furnace was purged of air and then filled with a gaseous mixture containing 98.0 volume percent of nitrogen gas and one volume percent of each of water vapor and hydrogen gas. The furnace was heated to a temperature of 1850° F. The assembled parts were then introduced into the furnace without disturbing either the set temperature or the atmosphere and held at that temperature for 15 minutes. The resultant seals were found to possess: a high degree of hermeticity; resistance to thermal shock; excellent seal strength; and to be substantially free of entrained gas bubbles. In addition, the seals showed acceptable intergranular oxide penetration.

EXAMPLE 2

Example 1 was repeated utilizing metal plates and pins which not only had not been pretreated, but had been deliberately contaminated by briefly immersing them in lubricating oil. In a conventional sealing procedure, such contaminants would be removed by a decarburizing step. The resulting seals were in all respects comparable to those formed in Example 1.

We claim:

1. A single-step process for fusing a glass to an untreated metal wherein the glass and the metal have similar coefficients of thermal expansion, said process consisting of:

heating the glass and the untreated metal in an atmosphere containing from about 1.0 to 1.5 volume percent of water vapor, from about 1.0 to 2.0 volume percent of hydrogen gas and the balance of an inert gas at a temperature of at least the melting point of the glass for a time sufficient to melt the glass and fuse the melted glass to untreated metal wherein said untreated metal is a metal which has not undergone decarburization nor oxidation.

2. The process of claim 1, wherein the inert gas is selected from the group consisting of nitrogen and argon.

3. The process of claim 2, wherein the inert gas is nitrogen.

4. The process of claim 1, wherein the glass and untreated metal are heated to a temperature of from about 1800° F. to 1900° F.

5. The process of claim 4, wherein the temperature is about 1850° F.

6. The process of claim 4, wherein said metal and glass are heated to about 1850° F. for about 15 minutes.

7. The process of claim 1, wherein said time is from about 10 to 20 minutes.

8. The process of claim 6, wherein said time is 15 minutes.

9. The process of claim 1, wherein the metal is from the group consisting of tungsten, molybdenum, titanium, tantalum, nickel-cobalt-iron alloys, chrome-iron alloys, and nickel-chrome-iron alloys.

10. The process of claim 1, wherein the glass is selected from the group consisting of borosilicates, lead silicates and borophosphosilicates.

11. The process of claim 1, wherein the difference in the coefficient of thermal expansion of the glass and metal does not exceed about $20 \times 10^{-7}$ cm/cm/° C.

12. The process of claim 1, wherein the reaction atmosphere contains about 1 volume percent of water vapor, about 1 volume percent of hydrogen gas and about 98 volume percent of nitrogen gas.

* * * * *